(12) United States Patent
Petri Larrea et al.

(10) Patent No.: US 8,356,982 B2
(45) Date of Patent: Jan. 22, 2013

(54) REVERSIBLE SYSTEM FOR DIVIDING AEROGENERATOR BLADES INTO SEVERAL PARTS

(76) Inventors: Guillermo Petri Larrea, Navarra (ES); José Sancho Rodriguez, Navarra (ES)

( * ) Notice: Subject to any disclaimer, the term of this patent is extended or adjusted under 35 U.S.C. 154(b) by 318 days.

(21) Appl. No.: 12/523,711

(22) PCT Filed: Jan. 4, 2008

(86) PCT No.: PCT/ES2008/000003
§ 371 (c)(1),
(2), (4) Date: Jul. 17, 2009

(87) PCT Pub. No.: WO2008/084126
PCT Pub. Date: Jul. 17, 2008

(65) Prior Publication Data
US 2011/0020129 A1    Jan. 27, 2011

(30) Foreign Application Priority Data
Jan. 8, 2007    (ES) ................... 200700059

(51) Int. Cl.
*F01D 5/14*    (2006.01)
(52) U.S. Cl. .............. 416/223 R; 403/296; 403/DIG. 15
(58) Field of Classification Search .................. 403/292, 403/294, 296, DIG. 15; 416/223 R, 231 B, 416/233
See application file for complete search history.

(56) References Cited

U.S. PATENT DOCUMENTS

| 2,312,489 | A | * | 3/1943 | Schaefer | 52/222 |
|---|---|---|---|---|---|
| 2,876,923 | A | * | 3/1959 | McLane et al. | 220/4.15 |
| 4,108,328 | A | * | 8/1978 | Page | 220/4.15 |
| 4,558,492 | A | * | 12/1985 | Hite et al. | 24/37 |
| 4,895,484 | A | * | 1/1990 | Wilcox | 411/85 |
| 5,219,449 | A | * | 6/1993 | Hoshino | 403/297 |
| 5,224,741 | A | * | 7/1993 | Burkit et al. | 285/114 |
| 5,544,865 | A | * | 8/1996 | Abbaticchio | 256/67 |
| 5,720,567 | A | * | 2/1998 | Rinderer | 403/314 |
| 6,345,925 | B1 | * | 2/2002 | Coleman | 403/24 |
| 6,575,293 | B2 | * | 6/2003 | Foster | 198/750.2 |
| 6,602,017 | B2 | * | 8/2003 | Overton et al. | 403/205 |
| 6,726,255 | B1 | * | 4/2004 | Ward | 285/373 |
| 6,820,309 | B1 | * | 11/2004 | Gersbach | 24/31 B |
| 6,957,518 | B1 | * | 10/2005 | Koch, Jr. | 52/849 |
| 7,153,090 | B2 | * | 12/2006 | DeLeonardo et al. | 415/4.2 |
| 7,165,293 | B2 | * | 1/2007 | Musil et al. | 24/37 |
| 7,284,960 | B2 | * | 10/2007 | Aynsley | 416/223 R |
| 7,393,488 | B2 | * | 7/2008 | Grose et al. | 264/254 |
| 7,597,500 | B2 | * | 10/2009 | Gernez | 403/403 |

(Continued)

FOREIGN PATENT DOCUMENTS

EP    1584817    10/2005

(Continued)

*Primary Examiner* — Joshua Kennedy
(74) *Attorney, Agent, or Firm* — Egber Law Officie, PLLC

(57) ABSTRACT

An aerogenerator blade assembly has a blade with a first side and a second side an insert member positioned therein and therebetween. The insert member has a first surface in toothed engagement with a toothed surface on an inner surface of the first side of the blade, The blade has a first sector and a second sector affixed to the insert member. A first positioning rod is affixed to the first and second sides of the first sector of the blade and with the insert member. A second positioning rod is affixed to the first and second sides of the second sector of the blade and with the insert member.

3 Claims, 3 Drawing Sheets

U.S. PATENT DOCUMENTS

| | | | |
|---|---|---|---|
| 7,976,275 B2 * | 7/2011 | Miebach et al. | 416/61 |
| 7,976,282 B2 * | 7/2011 | Livingston et al. | 416/226 |
| 2002/0046927 A1 * | 4/2002 | Foster | 198/750.4 |
| 2006/0038164 A1 * | 2/2006 | Sicking et al. | 256/13.1 |
| 2006/0127222 A1 | 6/2006 | Arelt | |
| 2006/0133937 A1 * | 6/2006 | DeLeonardo et al. | 416/132 B |
| 2008/0145231 A1 * | 6/2008 | Llorente Gonzales et al. | 416/243 |
| 2008/0181781 A1 * | 7/2008 | Livingston et al. | 416/223 R |
| 2008/0213097 A1 * | 9/2008 | Oleson et al. | 416/210 R |
| 2009/0103997 A1 * | 4/2009 | Csik et al. | 411/112 |
| 2009/0162208 A1 * | 6/2009 | Zirin et al. | 416/226 |
| 2010/0104445 A1 * | 4/2010 | Aynsley | 416/223 R |

FOREIGN PATENT DOCUMENTS

| | | |
|---|---|---|
| ES | 2178903 | 1/2003 |
| ES | 2217026 | 11/2004 |
| JP | 2004011616 | 1/2004 |

* cited by examiner

REVERSIBLE SYSTEM FOR DIVIDING AEROGENERATOR BLADES INTO SEVERAL PARTS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention is encompassed within the aerogenerator technology sector, more specifically, the industrial sector that manufactures and assembles aerogenerator blades, and relates to an alternative for assembling aerogenerator blades based on the manufacture of said blades in sections, in such a manner that the final assembly is carried out by means of inserts specifically designed for such a purpose.

2. Description of Related Art Including Information Disclosed Under 37 CFR 1.97 and 37 CFR 1.98

To date, all blades are formed by joining different components during the workshop manufacturing process but emerging in a single piece from the large molds used for final curing of the assembly. The process for manufacturing and curing the matrix material and adhesives used determines the manufacturing time of the parts. Once the blade is manufactured, the difficulty in storage and transport thereof arises due to its large size. Likewise, the mounting thereof onto the bushing, and the bushing onto the generator axle, is carried out by moving large-sized assemblies, with the ensuing difficulty of assembly and fixing thereof.

The present invention aims to offer a new solution to the previously expounded problems. Different works with the same intention are known, although none of these nor the inventions registered to date have demonstrated their use or capacity to manufacture the blades in several parts and assemble them onsite.

BRIEF SUMMARY OF THE INVENTION

The foundation of the invention is based on the manufacture of blades in sections and assembly thereof, joining the sections at the wind farm at the base of the tower, by means of specifically designed inserts, with all the advantages that this entails.

The main advantages of the present invention are, on one hand, planning the production of the different sectors involved in the manufacture of the blades, without having to depend on the time required to form the whole blade, but rather its constituent parts. On the other hand, it allows storage of the smaller parts, in addition to planning the transport and use of transport means of shorter length and width, considerably expediting the permit process and reducing the terms and costs derived from transporting the blades from the point of manufacture to that of installation. The present invention allows great ease of handling and assembly at the wind farm itself, given that smaller parts must be moved and joined together, which also implies that the blade parts are joined together in a simpler and faster manner, thereby guaranteeing joint correctness. As the joint is detachable, the damaged parts of a blade can be substituted with other new ones without having to replace the whole blade, as at present.

The invention guarantees the use of current molds for the manufacture of blades, allowing the manufacturer's original blade design to be maintained, adding specific components to the blade laminate during the manufacturing process in order to obtain the correct joint between the blade sector and the insert. Specific molds designed to obtain the necessary geometry so that the joint between the insert and the blade sectors is adequate for correct stress transmission may also be introduced.

The joint between the insert and the blade sector may be resolved by means of traditional mechanical, physical or material fusion (solders with and without addition of material) joints or by means of adhesive or other types of joints designed for such purpose.

The blades and inserts may be designed with different apertures, angles, lengths, geometries, thicknesses and with different material qualities and treatments of all kinds (thermal, anti-corrosive, mechanical, superficial, etc.) which may be applied to these in order to fulfill their function. They may also be designed using different materials (metals, alloys, steels, polyamides, technical plastics, aluminum, combinations of these and/or any material both reinforced with fibers or particles of any kind or not reinforced, which may be applied to fulfill their function) in addition to different characteristics such as ductility, malleability, plasticity, elasticity, superficiality, resistance, etc., proposed to improve said function. Likewise, the inserts may be disposed inside or outside of the original blades and may be made of a single piece or of different components and inserts having more than one part disposed for such purpose.

BRIEF DESCRIPTION OF THE SEVERAL VIEWS OF THE DRAWINGS

For the purpose of complementing the preceding description and helping to better understand the characteristics of the invention, a detailed description of a preferred embodiment, based on a set of drawings that accompany this specification, will be carried out, wherein the following have been represented in a merely indicative and non-limiting manner.

Figure 1:
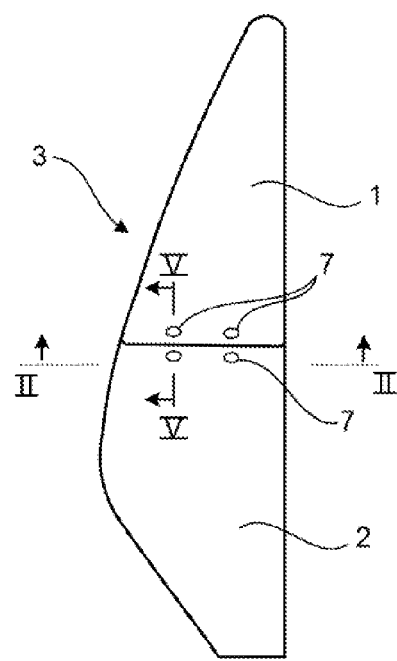
FIG. 1 shows a front elevation view of an aerogenerator blade.

In the preceding figures, the numerical references correspond to the following parts and elements:

1. Sector 1 of blade
2. Sector 2 of blade
3. Blade
4. Insert
5. Floating nut 6. Inner blade cavity
7. External access
8. Threaded positioning rod

DETAILED DESCRIPTION OF THE INVENTION

Figure 3:
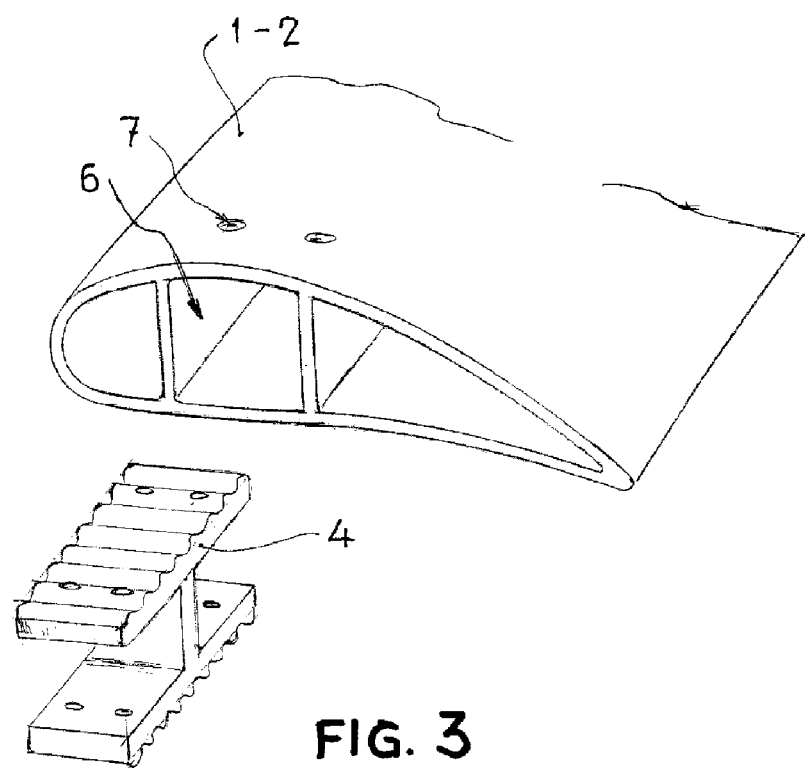
FIG. 3 shows an exploded perspective view of the insert in one of the blade sectors.

The invention consists, as can be observed in FIGS. 1 and 3, of joining two sectors 1 (1) and 2 (2) of the blade (3), each of said sectors being designed to absorb the cut, flexional, traction and torsion stresses to which they are subjected. The joint is made by means of a central insert (4) specifically designed for said function which offers the adequate characteristics of rigidity, weight and mechanical resistance for blade operation.

Figure 2:
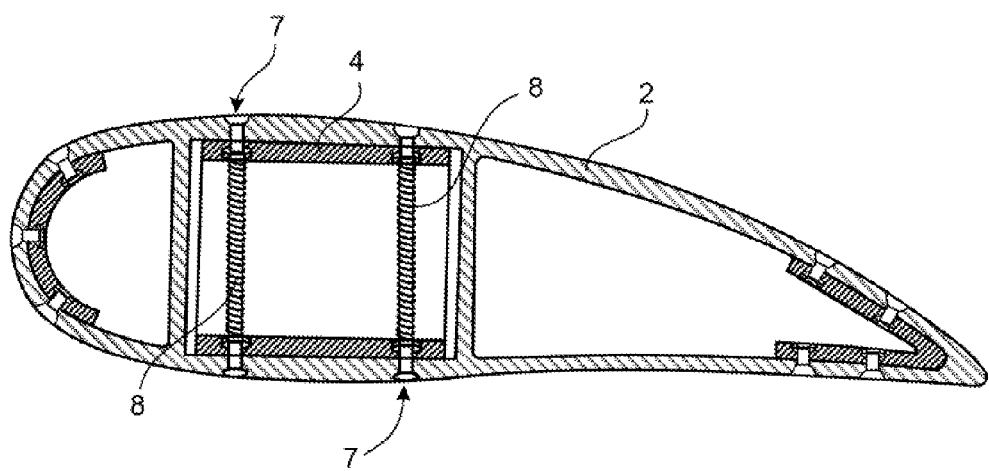
FIG. 2 shows a sectional view along line II-II of FIG. 1.
Figure 4:
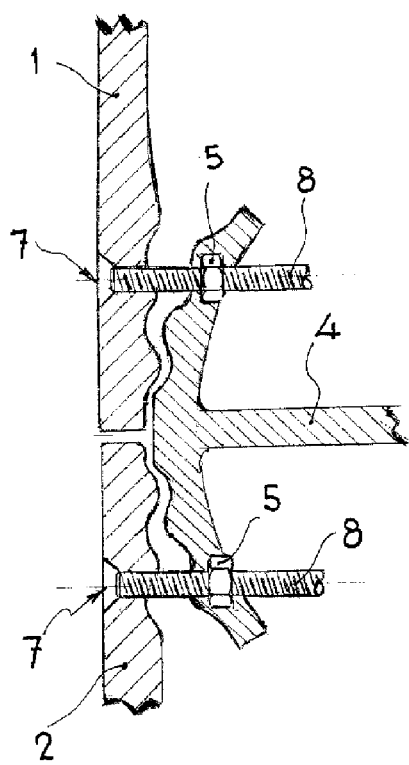
FIG. 4 shows a sectional view along line IV-IV of FIG. 2 during assembly.
Figure 5:
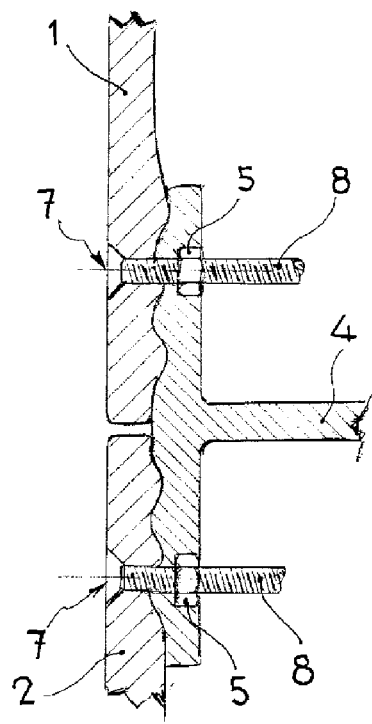
FIG. 5 shows a sectional view along line IV-IV of FIG. 2 after assembly.

As can be observed in FIGS. 2 and 3, the insert (4) must adapt to the inner cavity (6) of the blade, taking the loads that it must bear into account, for which purpose a floating nut (5) is inserted in said insert (4), wherethrough a threaded positioning rod (8) is introduced which, on being rotated in one direction reduces the cross-sectional area of the insert (4), as can be observed in FIG. 4, deforming the insert (4) in such a manner that it may be introduced in the specific inner cavity (6). This same effect can be obtained by means of other systems aimed at reducing the size of the insert to allow introduction thereof into the central core of the blade. Once the insert (4) has been introduced into the corresponding cavity (6), the threaded rod is rotated from the external access (7) of the blade sectors, in such a manner that, by manipulating it in the opposite direction, this insert, having a specific tooth form design, returns to its original position, as can be observed in FIG. 5. The toothing of the insert (4) is coupled to the toothing of the blade sectors, favoring the necessary and adequate rigidity, weight and resistance for blade operation.

This phase of the process could have variations if it is wished to make permanent joints (not detachable), joining the central insert to the blade sectors by means of adhesives, rivets, screws of any type, inner conical seatings and/or any other known means. Likewise, variations could occur in the event of using an element for connection to the blade.

After introducing the central insert, the assembly is reinforced by means of simple inserts at the ends of the specifically designed blade sector joints, as can be observed in FIG. 2 and, finally, the small superficial marks remaining on the blade surface are sealed to enhance aerodynamic behavior.

There are other variants of inserts and blades, as in the case of designs with different apertures, angles, lengths, geometries, thicknesses and different materials, material qualities and characteristics, and treatments of all kinds, disposing the inserts inside or outside of the original blades and made of a single piece or of different components or inserts having more than one part disposed for such purpose, observing the essentiality of the invention, which can be considered as being evident to a person skilled in the art.

The main joint, according to the design of the blade, could occur in areas that do not correspond with the central cavity and, in all cases, could be made both inside and outside of the blade.

We claim:

1. An apparatus comprising:

an aerogenerator blade having a first side and a second side with a space defined therebetween, said first side having a first hole and a second hole formed therethrough in spaced relation to each other, said second side having a first hole and a second hole formed therethrough in spaced relation to each other, said first side having a toothed surface on an inner surface thereof;

an insert member positioned in said space between said first side and said second side of said aerogenerator blade, said insert member having a first surface having a toothed area meshed with said toothed surface a said first side of said aerogenerator blade, said insert member having a second surface positioned against an inner surface of said second side of said aerogenerator blade, said insert member having a cross-member extending between said first and second surfaces thereof, at least one of said first and second surfaces of said insert member having a first nut and a second nut embedded therein, said first and second nuts being axially aligned with said first and second holes of said first side and with said first and second holes of said second side of said aerogenerator blade;

a first threaded rod threadedly received by said first nut, said first threaded rod having a first end in said first hole of said first side of said aerogenerator blade and a second end in said first hole of said second side of said aerogenerator blade; and a second threaded rod threadedly received by said second nut, said second threaded rod having a first and second rod having a first end in said second hole of said first side of said aerogenerator blade and a second end in said second hole of said second side of said aerogenerator blade.

2. The apparatus of claim 1, said first side of said aerogenerator blade having a first sector and a second sector, said first hole formed in said first sector, said second hole formed in said second sector.

3. The apparatus of claim 1, said first surface of said insert member being bendable at one side of said cross-member, said first threaded rod being rotatable so as to draw said one side of said first surface of said insert member toward said inner surface of said first side of said aerogenerator blade, said second threaded rod being rotatable so as to draw said opposite side of said first surface of said insert member toward said inner surface of said first side of said aerogenerator blade.

* * * * *